No. 863,422. PATENTED AUG. 13, 1907.
C. NEWTON.
AUTOMATIC COASTER AND BRAKE HUB.
APPLICATION FILED SEPT. 29, 1904. RENEWED MAY 29, 1907.

WITNESSES:

INVENTOR
Charles Newton
BY
Sturtevant & Truby
Attorneys.

UNITED STATES PATENT OFFICE.

CHARLES NEWTON, OF TORRINGTON, CONNECTICUT, ASSIGNOR TO STANDARD SPOKE & NIPPLE COMPANY, OF TORRINGTON, CONNECTICUT, A CORPORATION OF CONNECTICUT.

AUTOMATIC COASTER AND BRAKE HUB.

No. 863,422.          Specification of Letters Patent.          Patented Aug. 13, 1907.

Application filed September 29, 1904, Serial No. 226,529. Renewed May 29, 1907. Serial No. 376,416.

To all whom it may concern:

Be it known that I, CHARLES NEWTON, a citizen of the United States, residing at Torrington, in the county of Litchfield, State of Connecticut, have invented certain new and useful Improvements in Automatic Coaster and Brake Hubs, of which the following is a description, reference being had to the accompanying drawing and to the letters and figures of reference marked thereon.

My invention relates to improvements in two speed and automatic coaster and brake hub of the type illustrated in the applications filed by Fred E. Brown and myself on the 9th day of June, 1904, Serial Nos. 211,795—211,799.

Briefly the object of the present invention is to provide a novel mechanism for shifting the movable clutch in devices of the character referred to, to change the speeds or to give a free wheel backward movement.

It has been found in practice that in the use of an entirely rigid shifting device with no yielding connection between the manual shifting lever and the movable clutch, if for any reason the teeth of the movable clutch are out of proper position with respect to the teeth of the stationary clutch, the teeth may simply be forced against each other and not mesh in the most efficient manner. Therefore, I have provided a yielding connection in the shiftable rod carrying the movable clutch, which aids in causing proper engagement of the teeth of the two clutches. I have also provided certain novel arrangements of operating mechanism, and the invention consists in the matters hereinafter described and referred to in the appended claims.

The invention is illustrated in the accompanying drawings, in which

Figure 1:
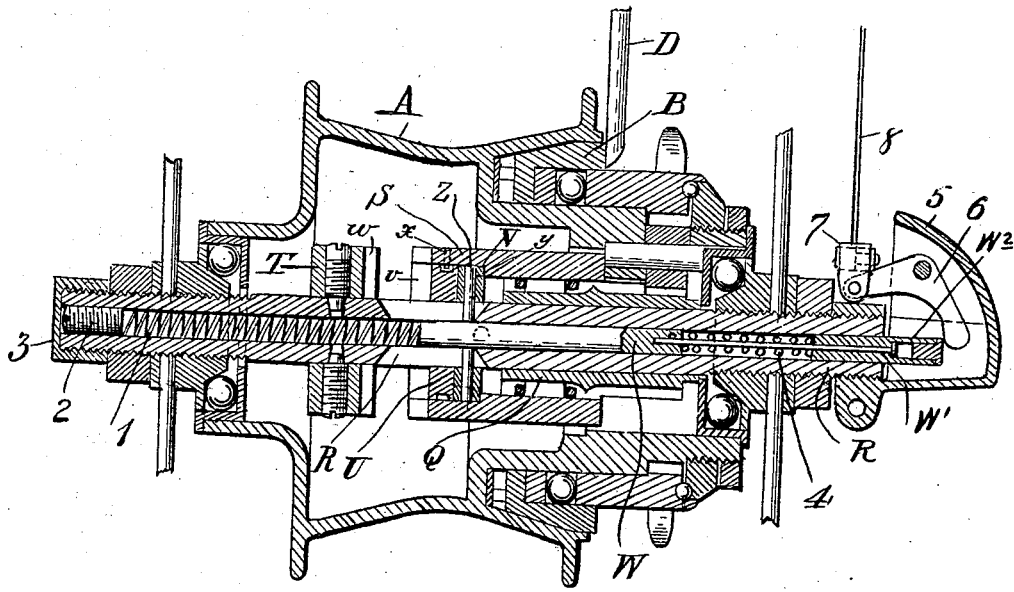
Figure 2:
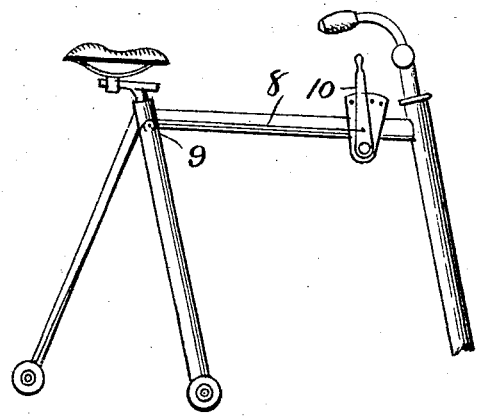

Figure 1 represents a view in central longitudinal section, the clutch being shown in proper position for high speed; and Fig. 2 is a detail view of the shifting cord or cable.

In these drawings, A represents the hub as a whole recessed to receive the brake shoe B, surrounding the cylindrical portion $c$ of the hub. The brake shoe has the arm D clamped in the usual manner to the machine frame (not shown), whereby the brake shoe is held against rotation.

R is the stationary hollow axle, carrying the sleeve Q, which is surrounded by and clutched in one direction to the movable clutch member S.

The clutch sleeve S has notches $v$ adapted to engage projections $w$ on the stationary member T of the clutch, which stationary member is secured to the axle R. Near its inner end the movable member S has one or more openings for the passage of pins or screws $x$, into a groove in the collar U, loose on the axle, which collar is adjacent to another collar V, fitting against a shoulder $y$ on the inner periphery of the movable clutch member, and having a pin Z passing through a slot in the axle, and engaging a sliding bar or rod W, which passes into the hollow axle, by manipulation of which rod, the movable member may be shifted to throw one or the other of the speeds into or out of operation.

Thus far the parts described are similar to those described and illustrated in the above entitled application, Serial No. 211,795, and need not be more particularly referred to.

To accomplish the object of the present invention, and overcome the defects mentioned above, the sliding rod or bar W, when shifted to throw the movable clutch into engagement with the stationary clutch is forced inward against the pressure of the spring 1, which is located within the hollow axle, and at one end rests against the end of the bar or rod W, and at the other end against the screw 2 secured in the end of the hollow axle, the end of which is covered by the axle cap 3. The sliding rod or bar W is cut off within the hollow axle, and fastened in its end is the headed pin or rod W', upon which slides a sleeve $W^2$, forming the outer end of the shifter rod or bar.

Between the sleeve $W^2$ and the end of the rod W is a coiled spring 4, which is compressed by the inward movement of the shifter rod sleeve $W^2$, said shifter rod sleeve having limited sliding movement on the pin W', as shown, but as the spring 4 is stiffer than the spring 1, this sliding movement does not take place until the notches $v$, engage the projections $w$, when if they do not properly engage further movement of the shifter rod, will compress the spring 4, and it will cause the movable and stationary clutch members to grip each other with a firm but yielding grip, thus avoiding strain due to a purely positive manual holding of the parts in engagement. To operate the shifter rod or bar, a shifter frame bracket 5 is provided secured to the axle, and having pivoted to it a bell crank lever 6, one end of which engages the outer end of the sleeve $W^2$, while the other end has attached to it a pivoted clamp 7, for the cable 8, which runs over a guide 9 on the frame to a lever 10, within reach of the operator, which is manipulated to swing the bell crank lever to shift the clutch in one direction and hold it, said clutch being returned when released by the spring 1. The lever 10 is pivoted on a notched plate, and is swung into engagement with the different notches to give the high speed, low speed or free wheel.

Having thus described my invention, what I claim as new and desire to secure by Letters Patent, is:—

1. In combination with the axle, the stationary clutch thereon, the movable clutch, the shifting device for the movable clutch, the sliding rod W, the sleeve $W^2$, the spring interposed between the two, and the rod connecting the same; substantially as described.

2. In combination with the axle, the stationary clutch thereon, the movable clutch, the shifting device for the movable clutch, the sliding rod W, the sleeve $W^2$, the spring interposed between the two, the rod connecting the same, and a bell crank engaging the rod $W^2$, and means for operating it; substantially as described.

In testimony whereof I affix my signature, in presence of two witnesses.

CHARLES NEWTON.

Witnesses:
D. HILDRETH,
J. V. WILSON.